US009126167B2

(12) United States Patent
Ljungblad

(10) Patent No.: US 9,126,167 B2
(45) Date of Patent: Sep. 8, 2015

(54) POWDER DISTRIBUTION IN ADDITIVE MANUFACTURING

(75) Inventor: Ulric Ljungblad, Moelndal (SE)

(73) Assignee: Arcam AB, Moelndal (SE)

( * ) Notice: Subject to any disclaimer, the term of this patent is extended or adjusted under 35 U.S.C. 154(b) by 0 days.

(21) Appl. No.: 14/390,978

(22) PCT Filed: May 11, 2012

(86) PCT No.: PCT/EP2012/058733
§ 371 (c)(1),
(2), (4) Date: Oct. 15, 2014

(87) PCT Pub. No.: WO2013/167194
PCT Pub. Date: Nov. 14, 2013

(65) Prior Publication Data
US 2015/0054191 A1    Feb. 26, 2015

(51) Int. Cl.
*B29C 67/00* (2006.01)
*B22F 3/105* (2006.01)
*B01J 6/00* (2006.01)
(Continued)

(52) U.S. Cl.
CPC .............. *B01J 6/005* (2013.01); *B22F 3/004* (2013.01); *B22F 3/1055* (2013.01); *B29C 67/0051* (2013.01); *B29C 67/0077* (2013.01); *B29C 67/0085* (2013.01); *B22F 2003/1056* (2013.01); *B33Y 10/00* (2014.12); *B33Y 30/00* (2014.12)

(58) Field of Classification Search
CPC .......... B22F 3/1055; B22F 2003/1056; B29C 67/0051; B29C 67/0077; B29C 67/0081; B29C 67/0085
See application file for complete search history.

(56) References Cited

U.S. PATENT DOCUMENTS 3,882,477 A    5/1975   Mueller
4,401,719 A    8/1983   Kobayashi et al.
(Continued)

FOREIGN PATENT DOCUMENTS

DE    19952998 A1    5/2001
DE    20305843 U1    7/2003
(Continued)

OTHER PUBLICATIONS

Cheah, Chi-Mun, et al., "Automatic Algorithm for Generating Complex Polyhedral Scaffold Structure for Tissue Engineering", Tissue Engineering, 2004, pp. 595-610, vol. 10, No. 3/4, XP002691483.
(Continued)

*Primary Examiner* — Mary F Theisen
(74) *Attorney, Agent, or Firm* — Alston & Bird LLP

(57) ABSTRACT

An additive manufacturing method for forming a three-dimensional article through successive fusion of parts of at least one layer of a powder bed provided on a work table. Providing at least one rotatable powder container above said work table, said powder container comprising at least one exit for providing powder to a powder table arranged beside said work table, at least one opening inside said container is spatially separated from and connected to said at least one exit. Ejecting a fixed amount of powder from said powder container during at least one predetermined segment of rotational angles of said powder container, from the exit of said powder container onto said powder table, wherein said fixed amount is determined by the shape and size of the at least one opening inside said container. Distributing said powder onto said work table with a powder distributor.

15 Claims, 17 Drawing Sheets

(51) Int. Cl.
  *B22F 3/00* (2006.01)
  *B33Y 10/00* (2015.01)
  *B33Y 30/00* (2015.01)

(56) References Cited

U.S. PATENT DOCUMENTS

| | | | |
|---|---|---|---|
| 4,818,562 | A | 4/1989 | Arcella et al. |
| 4,863,538 | A | 9/1989 | Deckard |
| 4,927,992 | A | 5/1990 | Whitlow et al. |
| 5,182,170 | A | 1/1993 | Marcus et al. |
| 5,647,931 | A | 7/1997 | Retallick et al. |
| 5,753,274 | A | 5/1998 | Wilkening et al. |
| 5,837,960 | A | 11/1998 | Lewis et al. |
| 5,876,550 | A | 3/1999 | Feygin et al. |
| 5,904,890 | A | 5/1999 | Lohner et al. |
| 5,932,290 | A | 8/1999 | Lombardi et al. |
| 6,419,203 | B1 | 7/2002 | Dang |
| 6,554,600 | B1 | 4/2003 | Hofmann et al. |
| 6,583,379 | B1 | 6/2003 | Meiners et al. |
| 6,751,516 | B1 | 6/2004 | Richardson |
| 6,764,636 | B1 | 7/2004 | Allanic et al. |
| 6,811,744 | B2 | 11/2004 | Keicher et al. |
| 6,815,636 | B2 | 11/2004 | Chung et al. |
| 6,824,714 | B1 | 11/2004 | Türck et al. |
| 7,003,864 | B2 | 2/2006 | Dirscherl |
| 7,165,498 | B2 | 1/2007 | Mackrill et al. |
| 7,204,684 | B2 | 4/2007 | Ederer et al. |
| 7,540,738 | B2 | 6/2009 | Larsson et al. |
| 7,686,605 | B2 | 3/2010 | Perret et al. |
| 7,696,501 | B2 | 4/2010 | Jones |
| 7,713,454 | B2 | 5/2010 | Larsson |
| 7,799,253 | B2 | 9/2010 | Höchsmann et al. |
| 7,871,551 | B2 | 1/2011 | Wallgren et al. |
| 8,083,513 | B2 | 12/2011 | Montero-Escuder et al. |
| 2002/0104973 | A1 | 8/2002 | Kerekes |
| 2003/0133822 | A1 | 7/2003 | Harryson |
| 2004/0084814 | A1 | 5/2004 | Boyd et al. |
| 2004/0104499 | A1 | 6/2004 | Keller |
| 2004/0173946 | A1 | 9/2004 | Pfeifer et al. |
| 2005/0186538 | A1 | 8/2005 | Uckelmann |
| 2006/0108712 | A1 | 5/2006 | Mattes |
| 2006/0147332 | A1 | 7/2006 | Jones et al. |
| 2006/0157892 | A1 | 7/2006 | Larsson |
| 2006/0180957 | A1 | 8/2006 | Hopkinson et al. |
| 2007/0175875 | A1 | 8/2007 | Uckelmann et al. |
| 2007/0182289 | A1 | 8/2007 | Kigawa et al. |
| 2007/0298182 | A1 | 12/2007 | Perret et al. |
| 2009/0017219 | A1 | 1/2009 | Paasche et al. |
| 2009/0152771 | A1 | 6/2009 | Philippi et al. |
| 2011/0133367 | A1 | 6/2011 | Weidinger et al. |
| 2011/0135840 | A1* | 6/2011 | Doye et al. .......... 427/554 |
| 2011/0316178 | A1 | 12/2011 | Uckelmann |
| 2013/0186514 | A1* | 7/2013 | Zhuang et al. .......... 141/11 |
| 2014/0015172 | A1* | 1/2014 | Sidhu et al. .......... 264/497 |
| 2014/0367367 | A1 | 12/2014 | Wood et al. |

FOREIGN PATENT DOCUMENTS

| | | |
|---|---|---|
| DE | 102005014483 A1 | 10/2006 |
| DE | 202008005417 U1 | 8/2008 |
| DE | 102007018601 A1 | 10/2008 |
| DE | 102008012064 A1 | 9/2009 |
| EP | 0289116 A1 | 11/1988 |
| EP | 0688262 A1 | 12/1995 |
| EP | 1418013 A1 | 5/2004 |
| EP | 1466718 A2 | 10/2004 |
| EP | 1683593 A2 | 7/2006 |
| EP | 1721725 A1 | 11/2006 |
| EP | 1952932 A2 | 8/2008 |
| EP | 2011631 A1 | 1/2009 |
| EP | 2119530 A1 | 11/2009 |
| EP | 2281677 A1 | 2/2011 |
| JP | 2003245981 | 9/2003 |
| SE | 524467 C2 | 8/2004 |
| WO | WO 93/08928 A1 | 5/1993 |
| WO | WO 97/37523 A2 | 10/1997 |
| WO | WO 01/81031 A1 | 11/2001 |
| WO | WO 01/85386 A2 | 11/2001 |
| WO | WO 02/08653 A1 | 1/2002 |
| WO | WO 2004/043680 A2 | 5/2004 |
| WO | WO 2004/054743 A1 | 7/2004 |
| WO | WO 2004/056511 A1 | 7/2004 |
| WO | WO 2006/091097 A2 | 8/2006 |
| WO | WO 2006/121374 A1 | 11/2006 |
| WO | WO 2007/112808 A1 | 10/2007 |
| WO | WO 2008/013483 A1 | 1/2008 |
| WO | WO 2008/057844 A1 | 5/2008 |
| WO | WO 2008/125497 A1 | 10/2008 |
| WO | WO 2008/147306 A1 | 12/2008 |
| WO | WO 2009/000360 A1 | 12/2008 |
| WO | WO 2009/072935 A1 | 6/2009 |
| WO | WO 2009/084991 A1 | 7/2009 |
| WO | WO 2010/095987 A1 | 8/2010 |
| WO | WO 2011/008143 A1 | 1/2011 |
| WO | WO 2011/030017 A1 | 3/2011 |
| WO | WO 2011/060312 A2 | 5/2011 |
| WO | WO 2012/102655 A1 | 8/2012 |
| WO | WO 2013/098050 A1 | 7/2013 |
| WO | WO 2013/098135 A1 | 7/2013 |
| WO | WO 2013/159811 A1 | 10/2013 |
| WO | WO 2014/071968 A1 | 5/2014 |
| WO | WO 2014/095200 A1 | 6/2014 |
| WO | WO 2014/095208 A1 | 6/2014 |

OTHER PUBLICATIONS

European Search Report dated Feb. 16, 2012, for corresponding Application No. EP07852089.7

Guibas, Leonidas J., et al., "Randomized Incremental Construction of Delaunay and Voronoi Diagrams", Algorithmica, Jun. 1992, pp. 381-413, vol. 7, Issue 1-6, Springer-Verlag, New York.

International Preliminary Examining Authority (IPEA), Second Written Opinion for International Application No. PCT/EP2012/076025, mailed Dec. 4, 2013, 4 pages European Patent Office, Germany.

International Preliminary Examining Authority, International Preliminary Report on Patentability for International Application No. PCT/EP2012/076025, including Applicant's Sep. 10, 2013 Response to the ISA's May 17, 2013 Written Opinion and Applicant's Jan. 14, 2014 Response to the IPEA's Second Written Opinion, mailed Apr. 4, 2014, 15 pages, European Patent Office, Germany.

International Preliminary Examining Authority, International Preliminary Report on Patentability for International Application No. PCT/EP2012/074383, including Applicant's Sep. 6, 2013 Reply to ISA's Feb. 27, 2013 Written Opinion, mailed Jan. 20, 2014, 16 pages, European Patent Office, The Netherlands.

International Preliminary Report on Patentability, dated Nov. 27, 2009, of corresponding international application No. PCT/SE2007/001084.

International Search Report dated Apr. 9, 2010 for Application No. PCT/SE2009/050901.

International Search Report dated Sep. 17, 2008 for Application No. PCT/SE2008/000007.

International Search Report mailed Sep. 2, 2008 of corresponding international application No. PCT/SE2007/001084.

International Searching Authority (ISA), International Search Report and Written Opinion for International Application No. PCT/EP2012/076025, mailed May 17, 2013, 11 pages, European Patent Office, The Netherlands.

International Searching Authority, International Search Report and Written Opinion for International Application No. PCT/EP2012/074383, mailed Feb. 27, 2013, 10 pages, European Patent Office, The Netherlands.

International Searching Authority, International Search Report for International Application No. PCT/SE2011/050093, mailed Oct. 20, 2011, 5 pages, The Swedish Patent and Registration Office, Sweden.

(56) References Cited

OTHER PUBLICATIONS

Weigel, TH., et al., "Design and Preparation of Polymeric Scaffolds for Tissue Engineering," Expert Rev. Med. Devices, 2006, pp. 835-851, vol. 3, No. 6, XP002691485.
Yang, et al., "The Design of Scaffolds for Use in Tissue Engineering, Part II, Rapid Prototyping Techniques", Tissue Engineering, 2002, pp. 1-11, vol. 8, No. 1, XP002691484.
International Searching Authority, International Search Report for International Application No. PCT/EP2012/057470, mailed Jan. 24, 2013, 1 page, European Patent Office, The Netherlands.
International Searching Authority, International Search Report for International for Application No. PCT/EP2012/058733, Mar. 5, 2013, 4 pages, European Patent Office, The Netherlands.

* cited by examiner

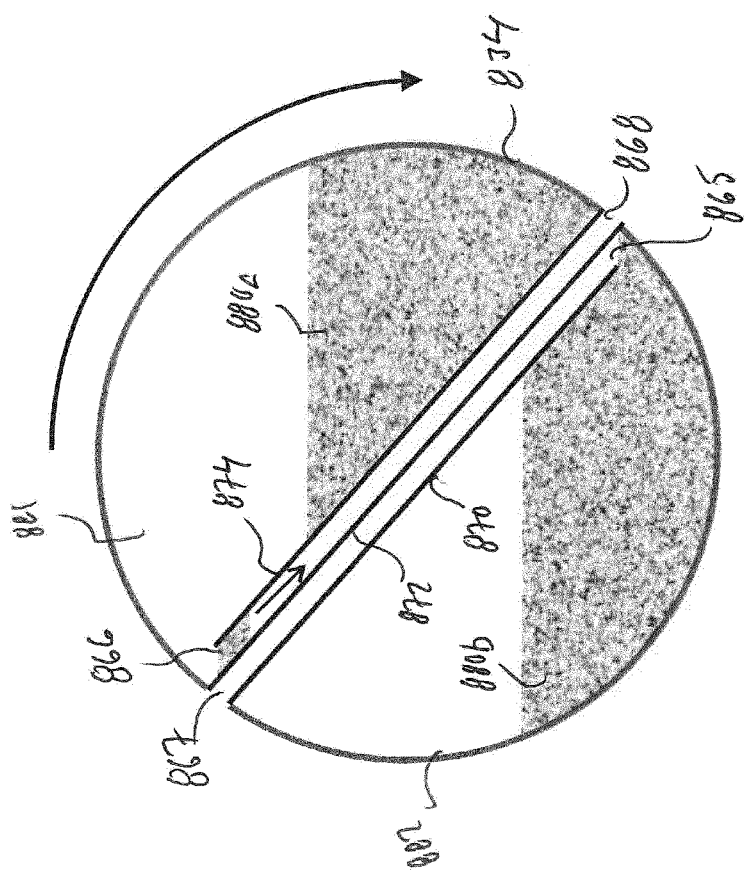

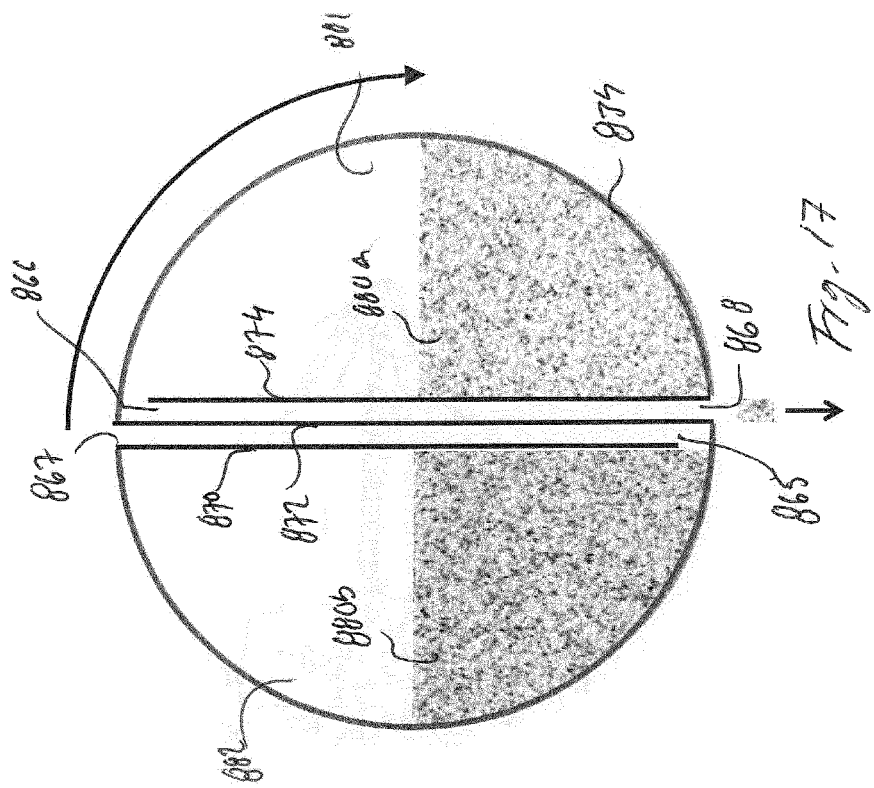

POWDER DISTRIBUTION IN ADDITIVE MANUFACTURING

CROSS REFERENCE TO RELATED APPLICATIONS

This application is a National Stage Application, filed under 35 U.S.C. §371, of International Application No. PCT/EP2012/058733, filed May 11, 2012, the contents of which are hereby incorporated by reference in their entirety.

BACKGROUND

1. Related Field

The present invention relates to a method and apparatus for additive manufacturing according to the preamble of the claims provided herein.

2. Description of Related Art

Freeform fabrication or additive manufacturing is a method for forming three-dimensional articles through successive fusion of chosen parts of powder layers applied to a worktable.

An additive manufacturing apparatus may comprise a work table on which said three-dimensional article is to be formed, a powder dispenser, arranged to lay down a thin layer of powder on the work table for the formation of a powder bed, an energy beam for delivering energy to the powder whereby fusion of the powder takes place, elements for control of the energy given off by the energy beam over said powder bed for the formation of a cross section of said three-dimensional article through fusion of parts of said powder bed, and a controlling computer, in which information is stored concerning consecutive cross sections of the three-dimensional article. A three-dimensional article is formed through consecutive fusions of consecutively formed cross sections of powder layers, successively laid down by the powder dispenser.

In additive manufacturing it is important to control the powder distribution. It is desirably to distribute a predefined amount of powder over a predetermined area. This requires a well defined method and apparatus for repeatedly removing a predetermined amount of powder from a powder storage to a powder distributor device.

One solution to the above mentioned problem of removing a predetermined amount of powder from a powder storage is disclosed in WO 2006/121374. In said document a distribution member is arranged movable a predetermined distance into a supply of powder. Said distance being sufficiently long to bring about a transfer of a predetermined portion of powder from the powder storage at one side of the distribution member to another side of the distribution member facing the working area.

A problem with said solution is that the powder quality, i.e., the powder humidity, powder composition, powder size and powder amount in the powder storage etc. may affect the amount removed from the powder storage.

BRIEF SUMMARY

An object of the invention is to provide a method and apparatus for additive manufacturing where the amount of powder removed from a powder storage may be equal independently of the powder quality.

The abovementioned object is achieved by the features in the method claimed herein.

In a first aspect of the invention it is provided an additive manufacturing method for forming a three-dimensional article through successive fusion of parts of at least one layer of a powder bed provided on a work table, which parts corresponds to successive cross sections of the three-dimensional article, said method comprising the steps of:

a. providing at least one rotatable powder container above said work table, said powder container comprising at least one exit for providing powder to a powder table arranged beside said work table, at least one opening inside said container is spatially separated from and connected to said at least one exit, b. rotating said powder container, c. ejecting a fixed amount of powder from said powder container during at least one predetermined segment of rotational angles of said powder container, as long as more than a predetermined amount of powder is remaining in the container, from the exit of said powder container onto said powder table, wherein said fixed amount is determined by the shape and size of the at least one opening inside said container, d. distributing at least a part of said fixed amount of powder from said powder table to said work table with a distributor for forming at least a part of a layer of said powder bed.

An advantage of the present invention is that the amount of powder provided on the powder table may be more precisely defined and the repeatability is improved compared to state of the art technique.

In one example embodiment of the present invention said method further comprising the step of:

providing at least a first container above a the powder table wherein said first container is capable of providing powder at said powder table beside and in the vicinity of said first end of the working table, providing at least a second container at a second end of said working table wherein said second container is capable of providing powder at said powder table beside and in the vicinity of said second end of the working table.

An advantage of said embodiment is that powder may be provided beside opposite sides of the work table.

In one example embodiment of the present invention said method further comprising the step of providing a first type of material in a first container and a second type of material in a second container.

An advantage of said embodiment is that 3-dimensonal article may be manufactured with different materials in different parts of said article.

In still another example embodiment of the present invention said first and second type of material differs in powder grain size only.

An advantage of said embodiment is that different parts of the article may be manufactured with different powder grain size. For instance may the core of the article be built with coarser powder and the outer parts of the article may be built with finer powder. This may in turn decrease the building time of the article.

In still another example embodiment of the present invention said first and second type of material differs in material composition.

An advantage of said embodiment is that the article may be built with a graded material, i.e., one type of material composition at a first end of a article and another type of material composition at a second end of the article. This may in turn decrease the cost of material for building the 3-dimensional article.

Another advantage of this embodiment is that new material compositions may be form at the additive manufacturing process by mixing different type of powders from at least two powder containers.

In still another example embodiment of the present invention, said method further comprising the step of providing a heater in at least one of said powder containers for drying said powder.

An advantage of said embodiment is that the powder may be dried at the same time as the 3-dimensional article is built.

In still another example embodiment of the present invention said powder is ejected when rotating said powder container in a first direction.

In yet another example embodiment of the present invention said method further comprising the step of: rotating the powder container in a second direction for prohibiting powder ejection.

An advantage of said embodiment is that the powder container may be rotated without powder ejection, which in turn means that the heating of the powder for removing moisture may be performed simultaneously as the powder container is rotating for increasing the efficiency in the drying of the powder without the need of ejecting powder onto the powder table.

In still another example embodiment of the present invention said method further comprising the step of separating said powder container and vacuum chamber by a valve allowing change of powder container during an additive manufacturing process.

In still another example embodiment of the present invention said method further comprising the step of providing at least one guide plate for guiding powder material from the powder container to the working table.

An advantage of said embodiment is that the powder size and position of the powder container is less critical. In a second aspect of the invention it is provided an additive manufacturing apparatus for forming a three-dimensional article through successive fusion of parts of at least one layer of a powder bed provide on a work table, which parts corresponds to successive cross sections of the three-dimensional article. Said apparatus comprises at least one rotatable powder container above said work table. Said powder container comprising at least one exit for providing powder to a powder table arranged beside said worktable. At least one opening inside said container is spatially separated from and connected to said at least one exit. A distributor is provided for distributing at least a part of said fixed amount of powder from said powder table to said work table for forming at least a part of a layer of said powder bed.

In an example embodiment of the present invention at least a first container is provided at a first end of the working table wherein said first container is capable of providing powder at said first end of the working table, at least a second container provided at a second end of said working table wherein said second container is capable of providing powder at said second end of the working table.

In another example embodiment of the present invention a heater is provided in at least one of said powder containers for drying said powder.

In still another example embodiment of the present invention said powder container and vacuum chamber are separated by a valve allowing change of powder container during an additive manufacturing process.

In yet another example embodiment at least one powder guide plate is provided for guiding powder material from the powder container to the working table.

BRIEF DESCRIPTION OF THE FIGURES

The invention will be further described in the following, in a non-limiting way with reference to the accompanying drawings. Same characters of reference are employed to indicate corresponding similar parts throughout the several figures of the drawings:

FIG. 16 depicts in a cross sectional view a forth position of a second embodiment of a rotating container, FIG. 17 depicts in a cross sectional view a fifth position of a second embodiment of a rotating container.

DETAILED DESCRIPTION OF VARIOUS EMBODIMENTS

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "three-dimensional structures" and the like as used herein refer generally to intended or actually fabricated three-dimensional configurations (e.g. of structural material or materials) that are intended to be used for a particular purpose. Such structures, etc. may, for example, be designed with the aid of a three-dimensional CAD system.

The term "electron beam" as used herein in various embodiments refers to any charged particle beam. The sources of charged particle beam can include an electron gun, a linear accelerator and so on.

Figure 2:
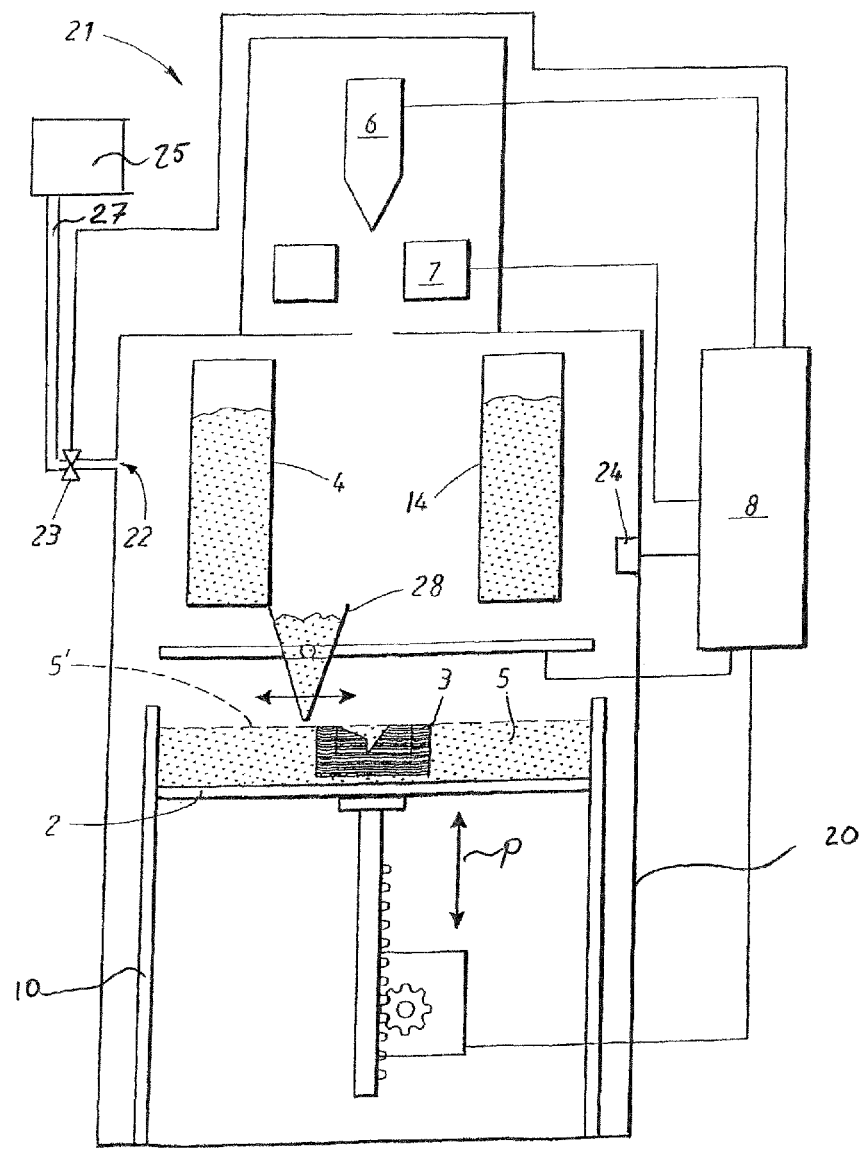
FIG. 2 shows, in a schematic view, a prior art embodiment of a device for producing a three dimensional product.

FIG. 2 depicts an embodiment of a freeform fabrication or additive manufacturing apparatus 21 in which the inventive method according to the present invention may be implemented.

Said apparatus 21 comprising an electron beam gun 6; deflection coils 7; two powder hoppers 4, 14; a build platform 2; a build tank 10; a powder distributor 28; a powder bed 5; and a vacuum chamber 20.

The vacuum chamber 20 is capable of maintaining a vacuum environment by means of a vacuum system, which system may comprise a turbomolecular pump, a scroll pump, an ion pump and one or more valves which are well known to a skilled person in the art and therefore need no further explanation in this context. The vacuum system is controlled by a control unit 8.

The electron beam gun 6 is generating an electron beam which is used for melting or fusing together powder material provided on the build platform 2. At least a portion of the electron beam gun 6 may be provided in the vacuum chamber 20. The control unit 8 may be used for controlling and managing the electron beam emitted from the electron beam gun 6. At least one focusing coil (not shown), at least one deflection coil 7, an optional coil for astigmatic correction (not shown) and an electron beam power supply (not shown) may be electrically connected to said control unit 8. In an example embodiment of the invention said electron beam gun 6 generates a focusable electron beam with an accelerating voltage of about 15-60 kV and with a beam power in the range of 3-10 Kw. The pressure in the vacuum chamber may be $10^{-3}$ mbar or lower when building the three-dimensional article by fusing the powder layer by layer with the energy beam.

The powder hoppers 4, 14 comprise the powder material to be provided on the build platform 2 in the build tank 10. The powder material may for instance be pure metals or metal alloys such as titanium, titanium alloys, aluminum, aluminum alloys, stainless steel, Co—Cr alloys, nickel based superalloys etc.

The powder distributor 28 is arranged to lay down a thin layer of the powder material on the build platform 2. During a work cycle the build platform 2 will be lowered successively in relation to a fixed point in the vacuum chamber. In order to make this movement possible, the build platform 2 is in one embodiment of the invention arranged movably in vertical direction, i.e., in the direction indicated by arrow P. This means that the build platform 2 starts in an initial position, in which a first powder material layer of necessary thickness has been laid down. Means for lowering the build platform 2 may for instance be through a servo engine equipped with a gear, adjusting screws etc.

An electron beam may be directed over said build platform causing said first powder layer to fuse in selected locations to form a first cross section of said three-dimensional article. The beam is directed over said build platform 2 from instructions given by the control unit 8. In the control unit 8 instructions for how to control the electron beam for each layer of the three-dimensional article is stored.

After a first layer is finished, i.e., the fusion of powder material for making a first layer of the three-dimensional article, a second powder layer is provided on said build platform 2. The second powder layer is preferably distributed according to the same manner as the previous layer. However, there might be alternative methods in the same additive manufacturing machine for distributing powder onto the work table.

After having distributed the second powder layer on the build platform, the energy beam is directed over said work table causing said second powder layer to fuse in selected locations to form a second cross section of said three-dimensional article. Fused portions in the second layer may be bonded to fused portions of said first layer. The fused portions in the first and second layer may be melted together by melting not only the powder in the uppermost layer but also remelting at least a fraction of a thickness of a layer directly below said uppermost layer.

Figure 1:
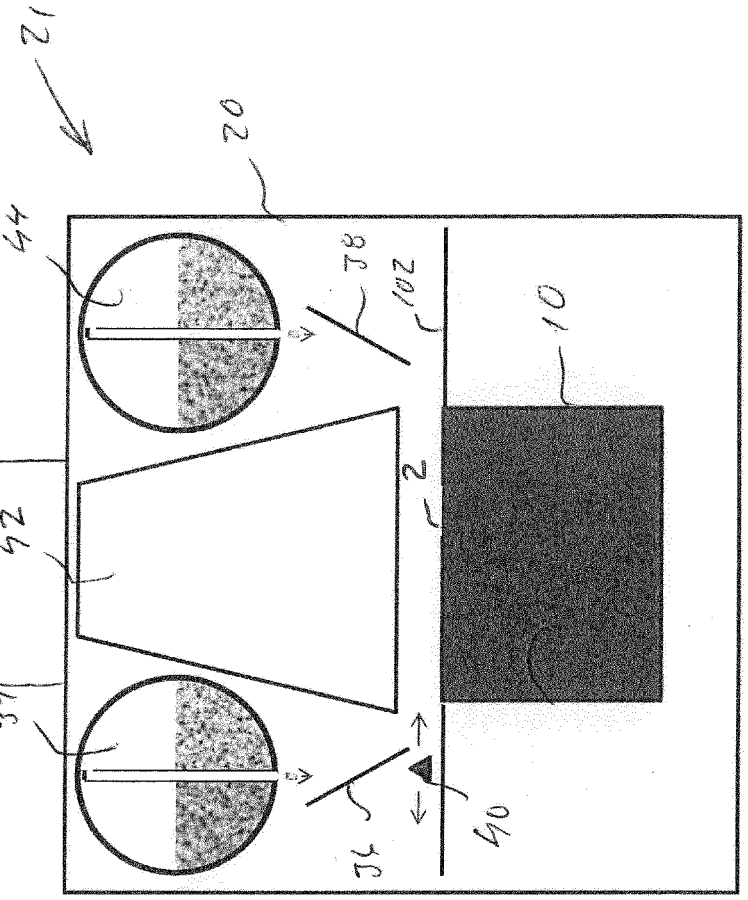
FIG. 1 depicts schematically a first example embodiment of an additive manufacturing apparatus according to the present invention.

FIG. 1 depicts schematically a first example embodiment of an additive manufacturing apparatus 21 according to the present invention. The additive manufacturing apparatus 21 comprising a vacuum chamber 20, a build tank 10, a work table 2, a powder table 102, a powder rake 40, a first rotatable powder container 34, a second powder container 44, an electron gun 6, a first powder guide plate 36, a second powder guide plate 38, and a heat shield 42.

The embodiment in FIG. 1 has two rotatable powder containers 34, 44 provided above the work table 2. A first rotatable powder container 34 for providing powder at the powder table 102 arranged beside a first end of said work table 2 and a second powder container 44 for providing powder at the powder table 102 arranged beside a second end of said work table 2.

However, in an alternative embodiment (not shown) only one rotatable powder container may be used for providing a predetermined amount of powder onto the powder table 102 arranged beside either the first or second end of the work table 2. Alternative embodiments with more than 2 rotatable powder containers are also possible, one of which will be described in more detail herein below.

In an alternative embodiment two powder container are arranged to one electrical motor for causing the rotation of both powder containers. The two powder containers may for instance be connected via a chain. Rotating one container with the single motor will causing both powder containers to rotate in the same direction because they are connected together via said chain or a belt.

The rotatable powder containers 34, 44 are in FIG. 1 arranged inside the vacuum chamber 20. A first electrical motor arranged outside the vacuum chamber 20 is connected to said first rotatable powder container 34 via an axis through said vacuum chamber 20. A second electrical motor arranged outside the vacuum chamber 20 is connected to said second rotatable powder container 34 via an axis through said vacuum chamber 20. The speed and starting of the rotation of said powder containers are managed by a control unit (not shown).

Figure 4:
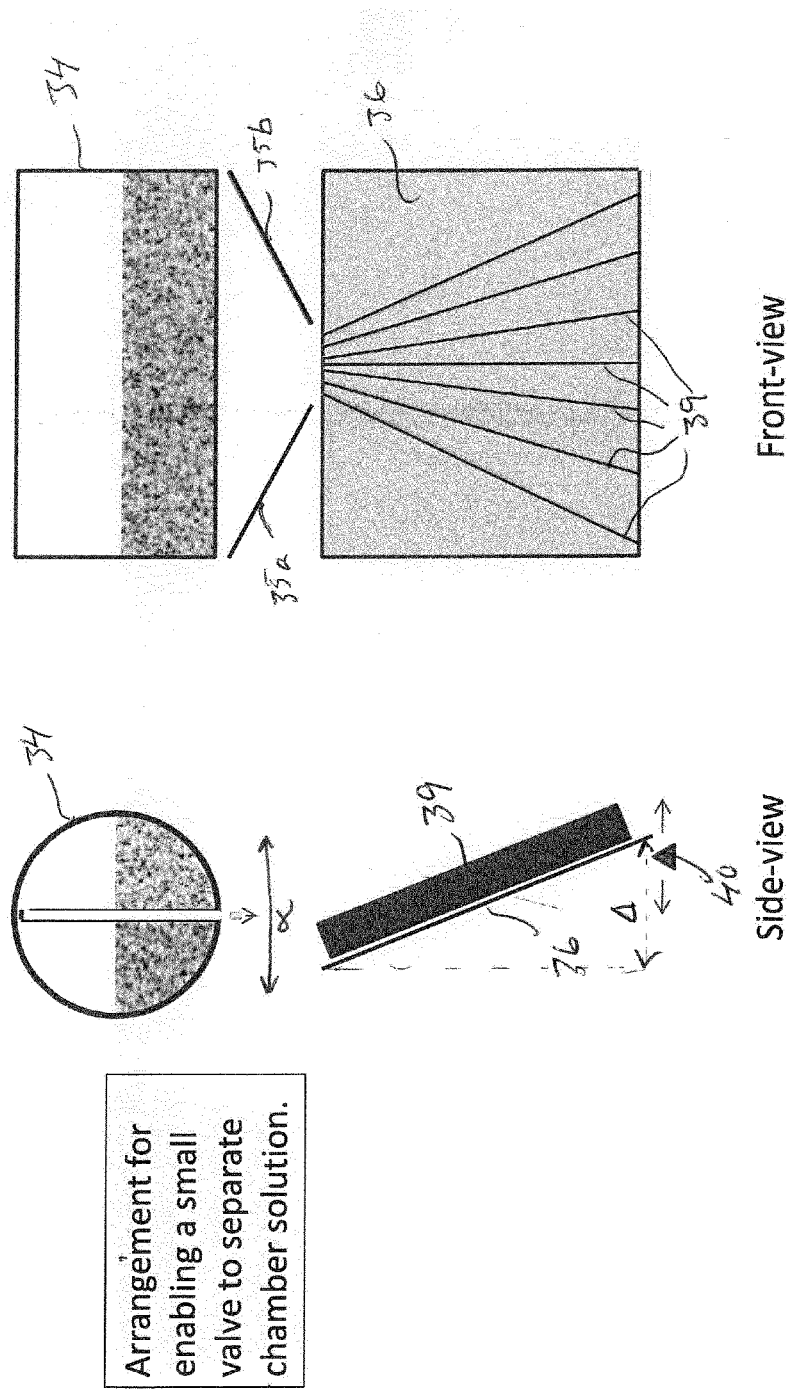
FIG. 4 depicts an example embodiment of a guide plate in the additive manufacturing apparatus according to the present invention

The first and second powder guide plates 36, 38 in FIG. 1 are optional. The powder guide plates 36, 38 may be used for guiding powder from the powder container to the powder table 102. By means of said powder guide plates 36, 38 said powder may be guided from one place where the powder container is arranged to another place where an end of said powder guide plate 36, 38 is arranged close to the powder table 102. This means that the powder may be translated in a direction towards or from the work table 2 by means of said powder guide plate 36, 38. An example embodiment of the optional powder guide plates 36, 38 is illustrated in FIG. 4. In the left most illustration the angle of the guide plate translates the powder a distance Δ to the right. The powder guide plate 36, 38 also provide the powder at a more concentrated position in a rake movement direction on the powder table 102.

Figure 3:
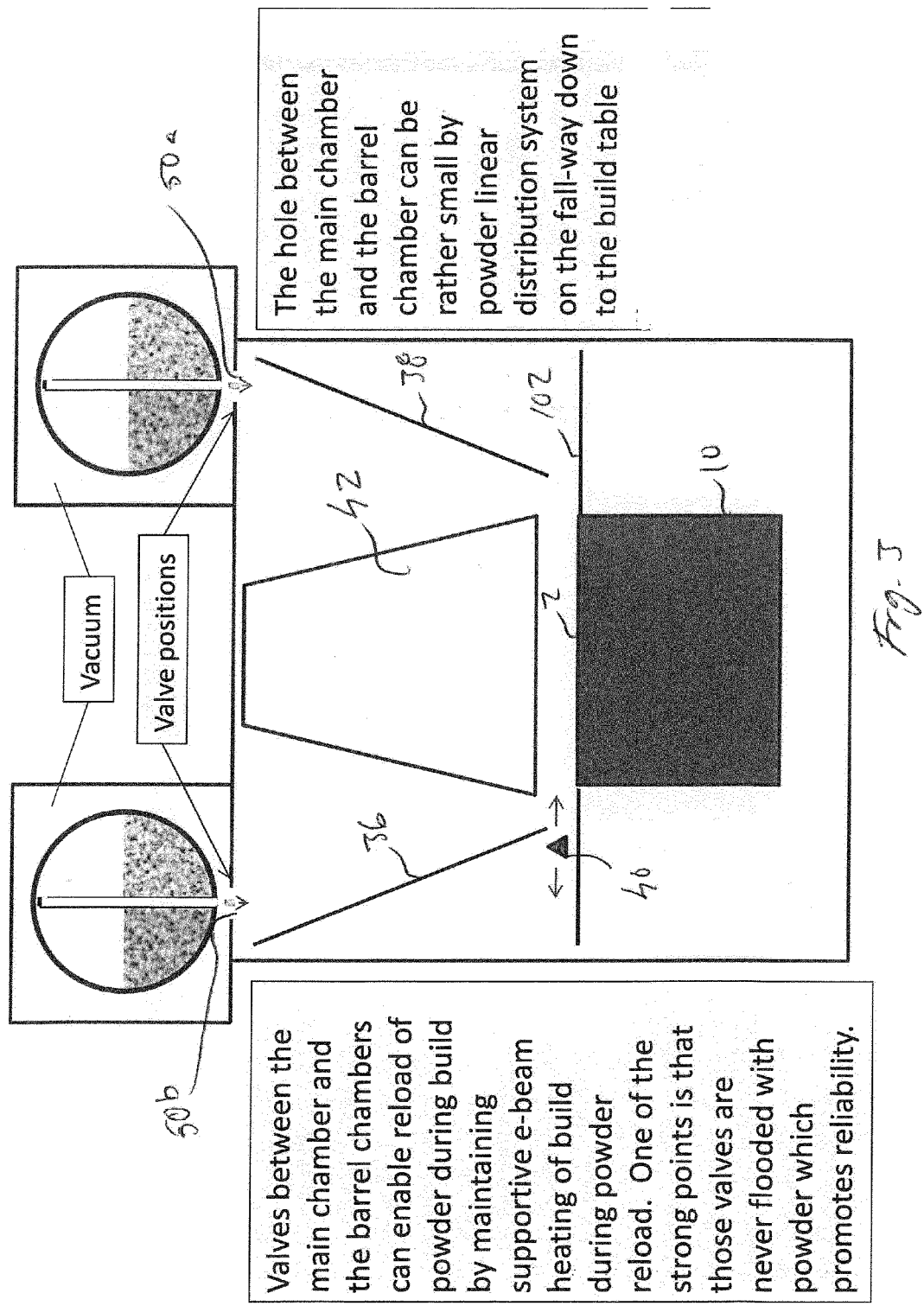
FIG. 3 depicts schematically a second example embodiment of an additive manufacturing apparatus according to the present invention.

Without the powder guide plate 36, 38 the powder would be spread over a distance α because powder is ejected from the powder container when said container is rotated. The rotation will move the exit of the powder container over a specific distance over the powder table. Said distance is mainly dependent on the size of the powder container. The bigger diameter the powder container the larger the α will be. Said powder guide plate 36, 38 is not only capable of guiding the powder from the powder container 34 to a predetermined position on the powder table, it may also spread the powder by using guiderails 39 provided on said powder guide plate 36, 38. The powder container 34 may be provided outside the vacuum chamber as depicted in FIG. 3. The powder from the powder container 34 must therefore in such case be let into the vacuum chamber. In order to reduce the size of the opening into the vacuum chamber size reduction plates 35a, 35b may be provided between the powder container and the vacuum chamber. These size reduction plates 35a, 35b, functions as a funnel and reduces the spatial surface of a valve 50a, 50b into the vacuum chamber. The guide rails have the functionality of spreading the powder so that a line of powder will have a length essentially equal to or longer than the width of the work table 2.

The heat shield 42 in FIG. 1 is also optional. It serves to better control the temperature of the non fused and fused powder in the build tank. The temperature inside said heat shield during manufacturing is likely to be higher than the surrounding areas inside the vacuum chamber.

The powder rake 40 moves back and forth in a first direction indicated by the arrows in FIG. 1. Powder ejected from the rotatable powder containers 34, 44 may essentially be provided onto the work table 2 along a line in a direction orthogonal to said first direction in which said powder rake 40 is moving. This means that the powder rake and the line of powder may essentially be parallel before distributing said powder evenly over the work table. Said line of powder is in FIG. 1 in a direction pointing into FIG. 1. Said first direction, in which said powder rake 40 is moving back and forth, may be essentially parallel with a length of said work table. Said second direction, along which said line of powder is applied onto the work table, may be essentially in parallel with a width of said work table.

Figure 5:
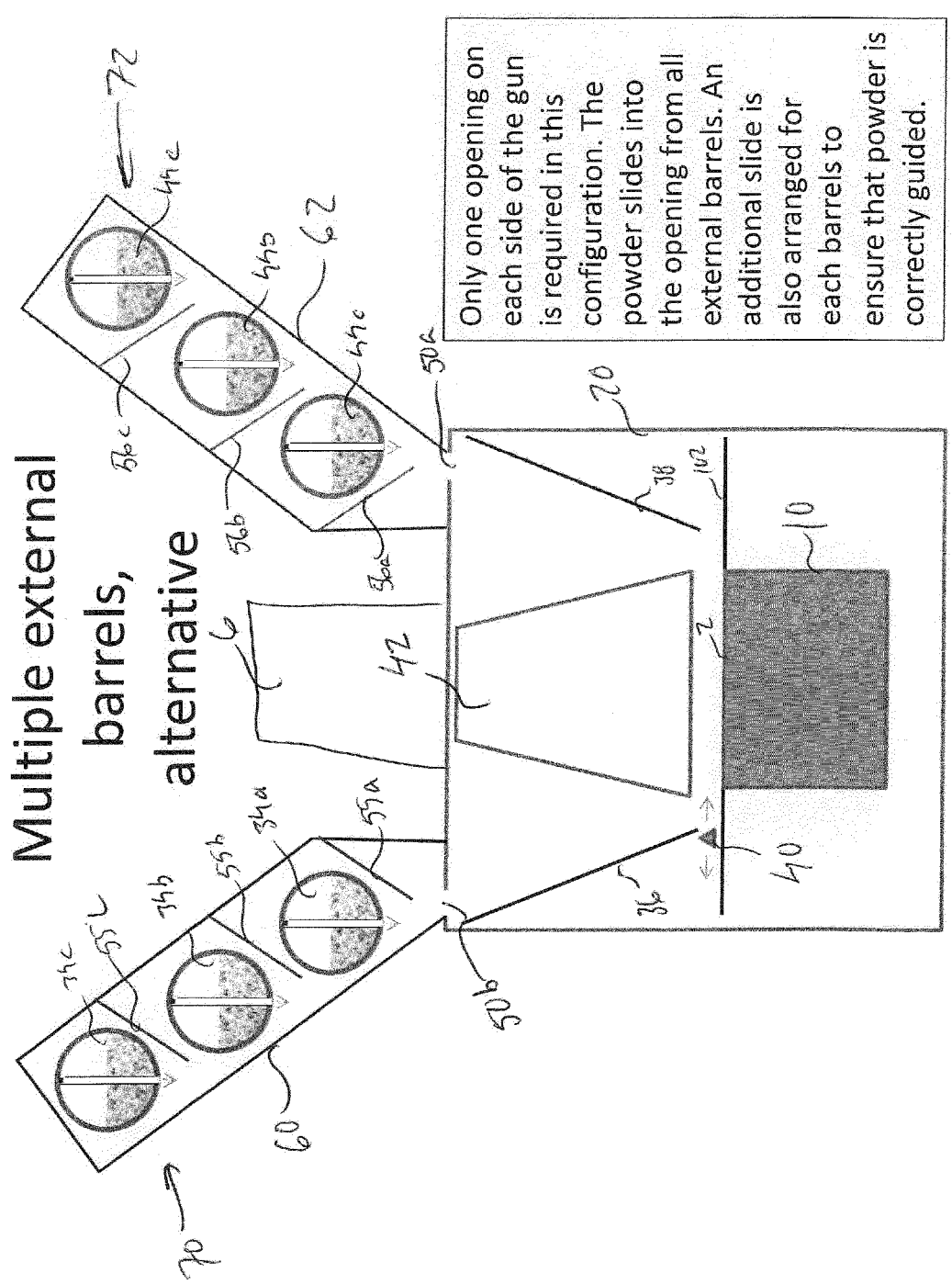
FIG. 5 depicts schematically a fifth example embodiment of an additive manufacturing apparatus according to the present invention.

FIG. 5 depicts an example embodiment of an additive manufacturing apparatus with multiple external rotatable powder containers. In addition to what is disclosed in FIG. 3, FIG. 5 has 4 more rotatable powder containers. A first stack of rotatable powder containers 70 comprises three rotatable powder containers 34a, 34b, 34c. A second stack of rotatable powder containers 72 comprises three rotatable powder containers 44a, 44b, 44c. A rotational axis of a first rotatable powder container 34a in the first stack of rotatable powder containers 70 is displaced vertically and horizontally in relation to a rotational axis of a second rotatable powder container 34b in said first stack of rotatable powder containers 70. A rotational axis of the second rotatable powder container 34b in the first stack of rotatable powder containers 70 is displaced vertically and horizontally in relation to a rotational axis of a third rotatable powder container 34c in said first stack of rotatable powder containers 70.

A rotational axis of a first rotatable powder container 44a in the second stack of rotatable powder containers 72 is displaced vertically and horizontally in relation to a rotational axis of a second rotatable powder container 44b in said second stack of rotatable powder containers 72. A rotational axis of the second rotatable powder container 44b in the second stack of rotatable powder containers 72 is displaced vertically and horizontally in relation to a rotational axis of a third rotatable powder container 44c in said second stack of rotatable powder containers 72.

Powders ejected from the first powder container 34a in said first stack of rotatable powder containers 70 is guided to the valve 50b into the vacuum chamber 20 via size reduction plates 55a, 60. Powders ejected from the second powder container 34b in said first stack of rotatable powder containers 70 is guided to the valve 50b into the vacuum chamber 20 via size reduction plates 55b, 60. Powders ejected from the third powder container 34c in said first stack of rotatable powder containers 70 is guided to the valve 50b into the vacuum chamber 20 via size reduction plates 55c, 60.

Powders ejected from the first powder container 44a in said second stack of rotatable powder containers 72 is guided to the valve 50a into the vacuum chamber 20 via size reduction plates 56a, 62. Powders ejected from the second powder container 44b in said second stack of rotatable powder containers 72 is guided to the valve 50a into the vacuum chamber 20 via size reduction plates 56b, 62. Powders ejected from the third powder container 44c in said second stack of rotatable powder containers 72 is guided to the valve 50a into the vacuum chamber 20 via size reduction plates 56c, 62.

Only one opening on each side of the electron gun 6 is required. Said openings may be provided with valves 50a, 50b which are opened for providing powder onto the powder table 102. In the example embodiment there is discloses an example embodiment with three stacked powder containers. One can immediately understand that this is just an example and any number of rotatable containers may be provided into said stack.

A first powder container 34a in said first stack of rotatable powder containers 70 may comprise a first type of material. A second powder container 34b in said first stack of rotatable powder containers 70 may comprise a second type of material. A third powder container 34c in said first stack of rotatable powder containers 70 may comprise a third type of material. The first second and third types of material may be of the same composition but with different grain size. For instance, a first range of powder grain size may be provided in said first powder container 34a, a second range of powder grain size may be provided in said second powder container 34b, and a third range of powder grain size may be provided in said third powder container 34c.

In another example embodiment said first, second and third types of material may be of different composition. For instance there may be TiAl6 in the first powder container 34a, pure Ti in the second powder container 34b and pure Al in the third powder container 34c.

In another example embodiment there is provided a first type of material in the first stack of rotatable powder containers 70, for instance TiAl6, and a second type of material in the second stack of rotatable powder containers 72, for instance Pure Ti. In said first stack of powder containers 70 the different powder containers 34a, 34b, 34c comprises different grain size of said first type of material, in this case TiAl6. In said second stack of powder containers 72 the different powder containers 44a, 44b, 44c comprises different grain size of said second type of material, in this case pure Ti. The first and second material being TiAl6 and pure Ti is just an example. One immediately understands that this first and second material can be exchanged by any type of pure material or a specific alloy, for instance different superalloys, stainless steel.

With this type of machine it is possible to build sandwiched metal 3-dimensional structures, i.e., engine components such as guide vanes for turbine engines with a first material composition or characteristics at a first end and a second material composition or characteristics at a second end. The material compositions can be selected to have specific mechanical characteristics such as ductility and tensile strength at a first end and the second end material could be chosen mainly for its good thermal characteristics.

It may also be possible to build 3-dimensional sandwiched structures where different alloys are stacked on top of each other, for instance different TiAl alloys. The sandwiching structure can be designed to maximize its tensile strength, ductility etc.

In another example embodiment two types of powdery materials may be fused together using a third powdery material which could be said to function as a soldering material.

At least one of the powder containers may comprise a heating element for heating the powder and thereby removing moisture. The heating may be performed during the rotation of the powder container. Moisture is removed from the powder container via vacuum pumps connected to each and every powder container or with one pump to the stack.

FIG. 6-12 disclose a first example embodiment of a rotatable powder container and its functionality. FIG. 13-17 disclose a second example embodiment of a rotatable powder container and its functionality.

Figure 6:
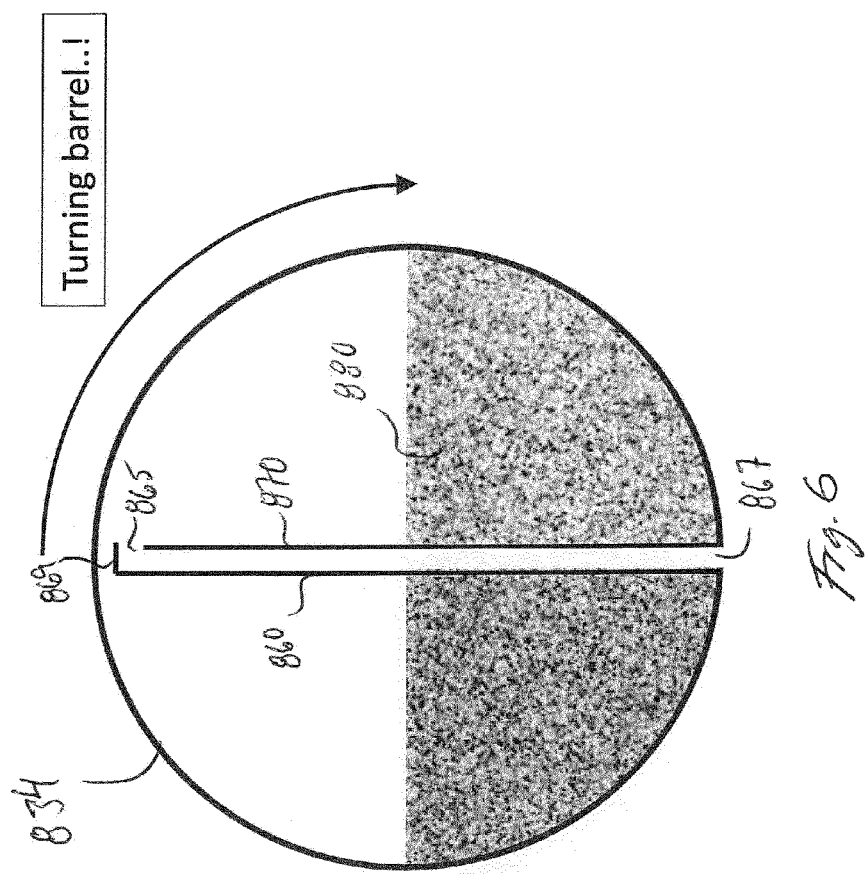
FIG. 6 depicts in a cross sectional view a first position of a first embodiment of a rotating container.

FIG. 6 depicts a cross sectional view from the side of an example embodiment of a powder container 834. The powder container in FIG. 6 is illustrated to have a circular cross section. Of course any shape of the cross section is possible, for instance, elliptical, rectangular, triangular or polygonal. The powder container 834 may having a length being essentially equal to or longer than the width of the work table 2. Using a shorter length of the powder container with respect to the width of the work table may need the above mentioned guide rails 39 for widening the powder distribution onto the powder table. The powder container 834 is provided with an exit 867 and an inlet 865. Said inlet and said exit 867 is connected to each other via a first inner wall 860 and a second inner wall 870. The second inner wall 870 is provided with an optional protrusion 869 at the inlet 865. Said optional protrusion 869 has the functionality of letting powder 880 into the inlet 865 when the powder container 834 is turned clockwise and prohibit powder 880 into the inlet 865 when turning the powder container 834 anti-clockwise, Powder may be transferred from one side to the other when turning the powder container in clockwise or anti clockwise direction. Another means for directing powder into the inlet is to make one of the inner walls 860, 870 higher than the other. In the example embodiment in FIG. 8-14 the first inner wall 860 is made longer than the second inner wall 870. The size and design of the inlet determines the amount of powder introduced into the inlet. When the powder container 834 is arranged as in FIG. 8 no powder 880 is ejected from the exit. The fixed amount of powder 899 is illustrated in FIGS. 10 and 17 with powder emitted from the container 834.

Figure 7:
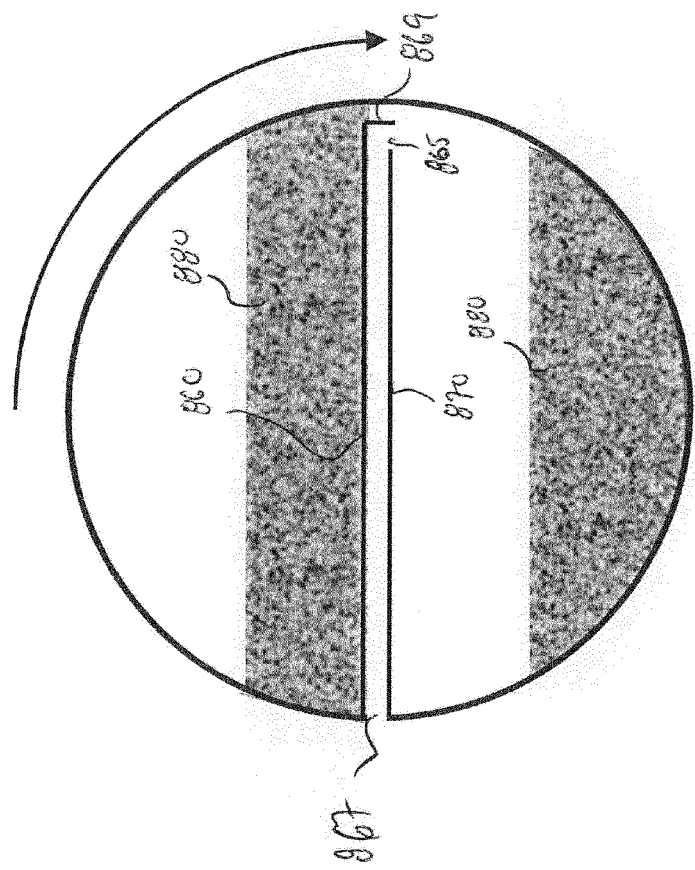
FIG. 7 depicts in a cross sectional view a second position of a first embodiment of a rotating container.
Figure 8:
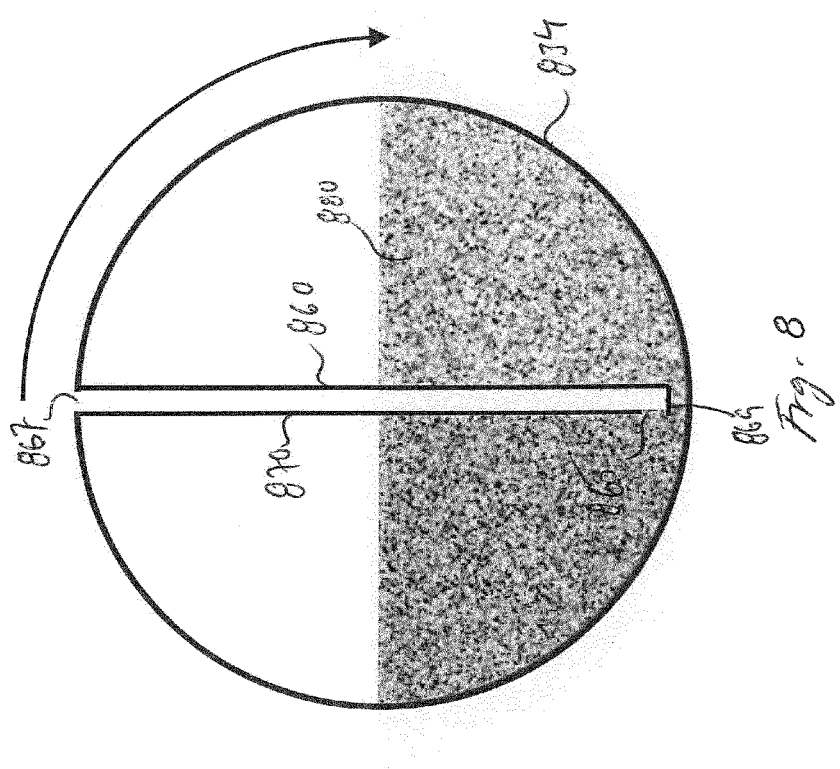
FIG. 8 depicts in a cross sectional view a third position of a first embodiment of a rotating container.

In FIG. 7 it depicted the same powder container as in FIG. 6 but rotated 90 clockwise. Still no powder is ejected from the exit 867. In FIG. 8 the powder container is rotated still 90 from the position in FIGS. 7 and 180 from the position in FIG. 6. At this position powder is starting to be fed into the inlet 865, however, still no powder is ejected from the exit 867.

Figure 9:
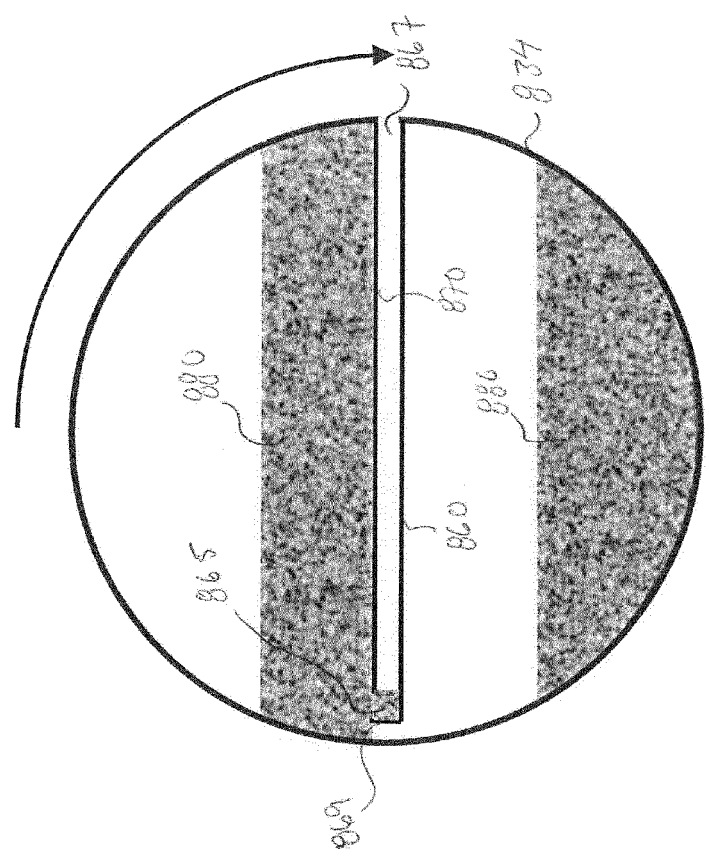
FIG. 9 depicts in a cross sectional view a forth position of a first embodiment of a rotating container.
Figure 10:
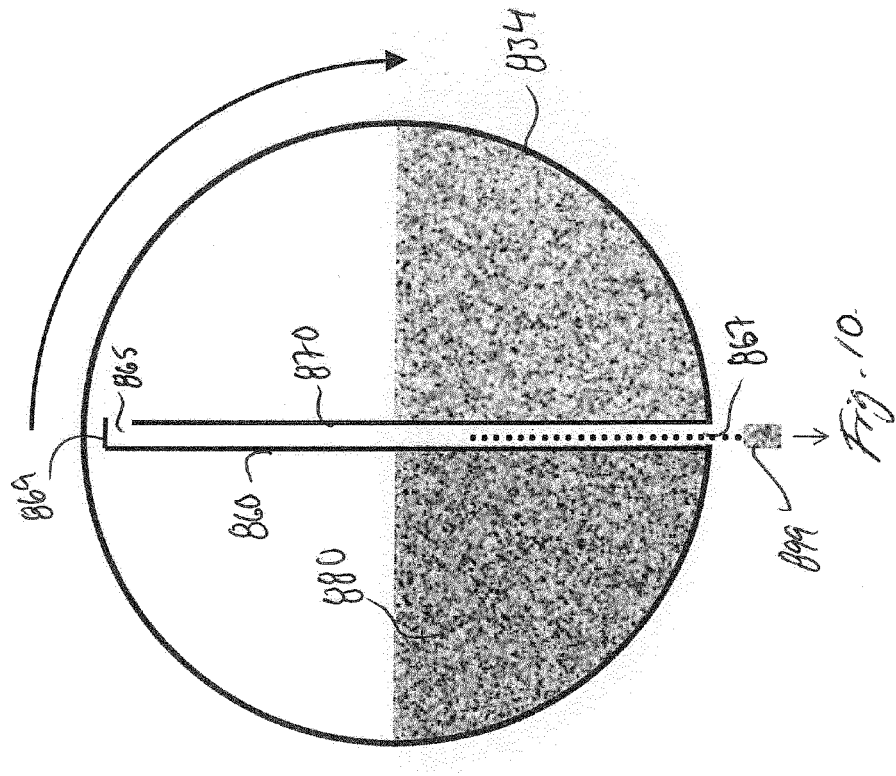
FIG. 10 depicts in a cross sectional view a firth position of a first embodiment of a rotating container.

FIG. 9 depicts the powder container 835 rotated another 90 from the position in FIGS. 8 and 270 degrees from the position in FIG. 6. Still there is no powder 880 ejected from the exit 867. In FIG. 10 the powder container has been rotated 360 from the position in FIG. 6, i.e., one turn. Powder starts to be ejected from the exit between 270 and 360 degrees of rotation from the position in FIG. 6. Powder is ejected during a predetermined range of rotational angles, for instance 300-375 degrees. The range is dependent on the amount of powder to be ejected and the shape and size of the inner walls connecting the inlet and the exit and the properties (flowability) of the powder. In the example embodiment depicted in FIG. 6-12 powder is only ejected once per revolution of the powder container when turning said powder container clockwise. If said powder container is turned anti-clockwise no powder will be ejected at any rotational angle. The fact that no powder is ejected when turning the powder container anti-clockwise may be used for drying said powder. In a setup with multiple powder containers those containers which are not at a give time being used for providing powder onto the powder table can be rotated in a direction which will prohibit powder ejection. At the same time as those powder containers are rotated with no powder ejection a heater may be turned on for heating the powder and thereby removing moisture. As the powder containers may be refilled during the manufacturing of the 3-dimensional article, new powder in a refilled powder container or a powder container which has not been used for a white may be dried before using the powder as building material.

Figure 11:
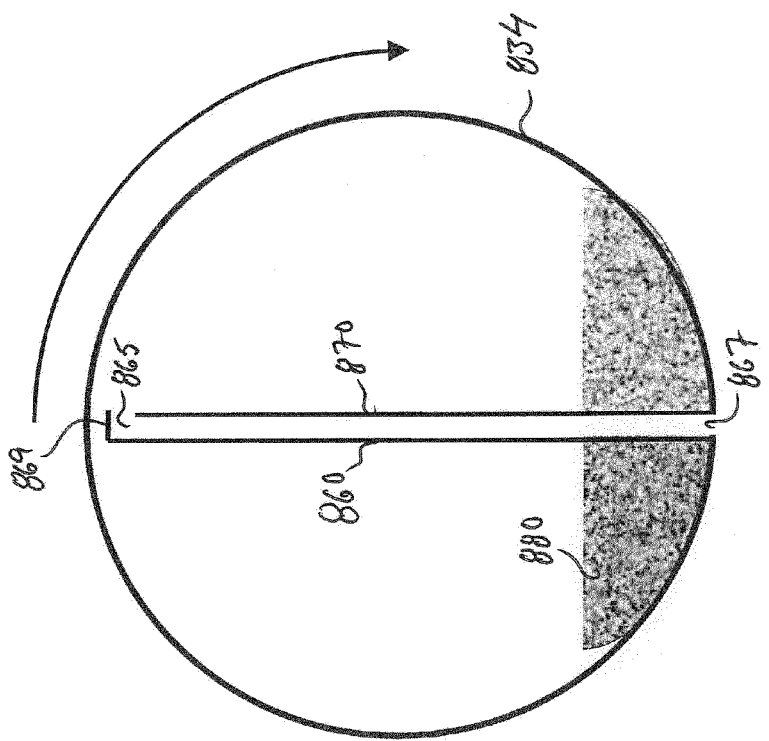
FIG. 11 depicts in a cross sectional view a first position of a first embodiment of a rotating container almost empty of powder.
Figure 12:
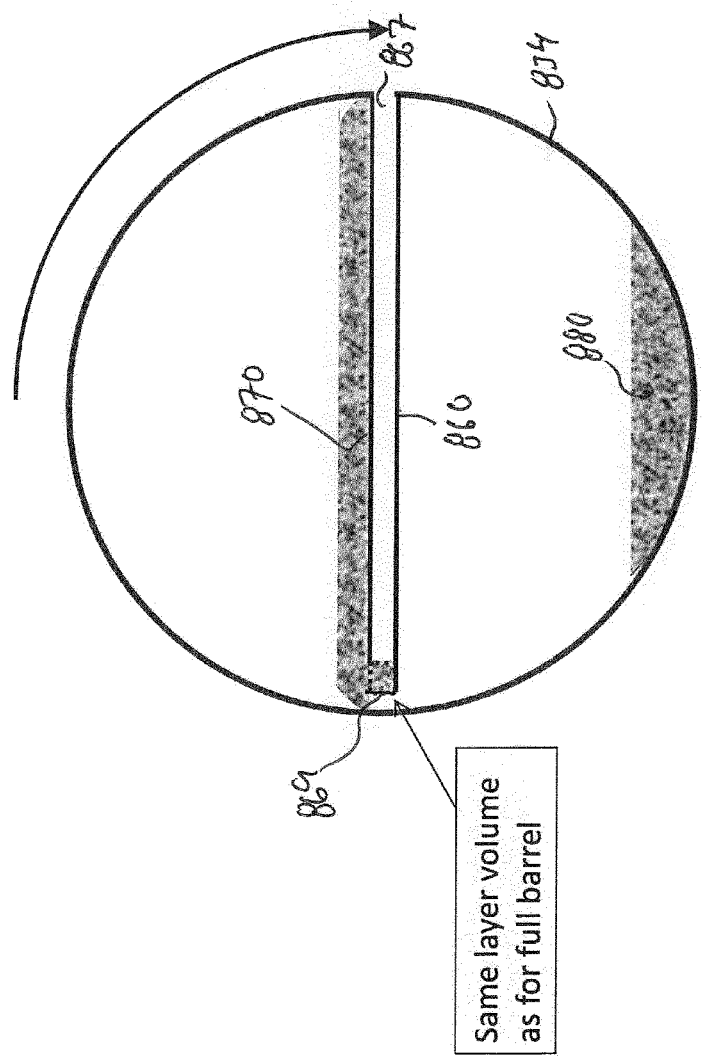
FIG. 12 depicts in a cross sectional view a fourth position of a first embodiment of a rotating container almost empty of powder.

FIGS. 11 and 12 illustrates that the functionality of the powder container also applies for an almost empty powder container. When the powder reaches a predetermined minimum level the amount of powder ejected from the exit is not well defined anymore. However, when the powder level is above said minimum level the ejected amount is essentially equal for each and every revolution of the powder container 834.

The powder container as illustrated in FIG. 8-14 is closed at its end wall positions and the inner walls are connected to end walls.

Figure 13:
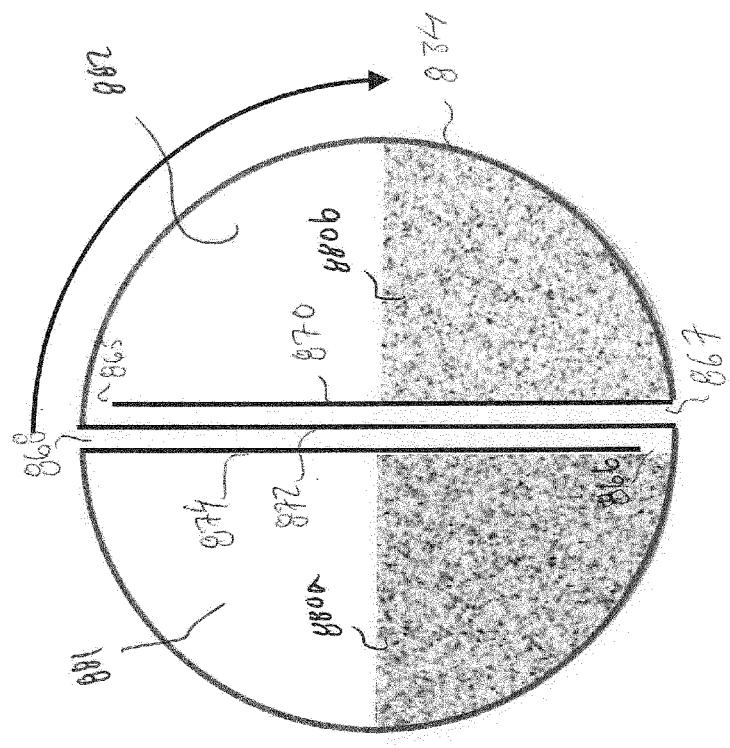
FIG. 13 depicts in a cross sectional view a first position of a second embodiment of a rotating container.

FIG. 13 depicts a second example embodiment of a powder container 834. In the example embodiment in FIG. 13 said powder container 834 comprises a first exit 867, a second exit 868, a first inlet 865, a second inlet 866, a first inner wall 870, a second inner wall 872 and a third inner wall 874. The first inlet is connected to the first exit via the first inner wall and the second inner wall. The second exit is connected to the second inlet via the second inner wall and the third inner wall. The first and third inner wall is having a height which is shorter than the diameter of the powder container. The second inner wall is with its ends connected to an inside of the powder container. In a first example embodiment said second inner wall is dividing the powder container in two equal halves 881, 882 and is thereby having a length equal to the inner diameter of the powder container. In another example embodiment the second inner wall is dividing the powder container into two unequal halves, and has therefore a length which is less than the diameter of the powder container. The distance of the first inner wall to the second inner wall may be equal to, less or larger than the distance between the second inner wall and the third inner wall. The size and shape of the inlet 865 may be equal or different to the size and shape of the inlet 866. The two halves may comprise different types of powder. A first half 881 may comprise a first type of material 880a and a second half 882 may comprise a second type of material 880b.

Figure 14:
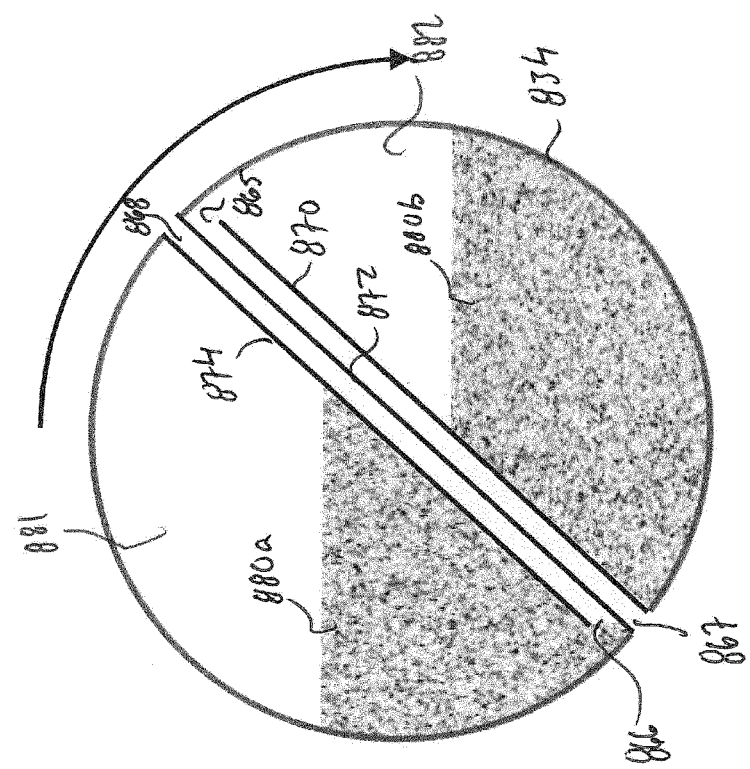
FIG. 14 depicts in a cross sectional view a second position of a second embodiment of a rotating container.
Figure 15:
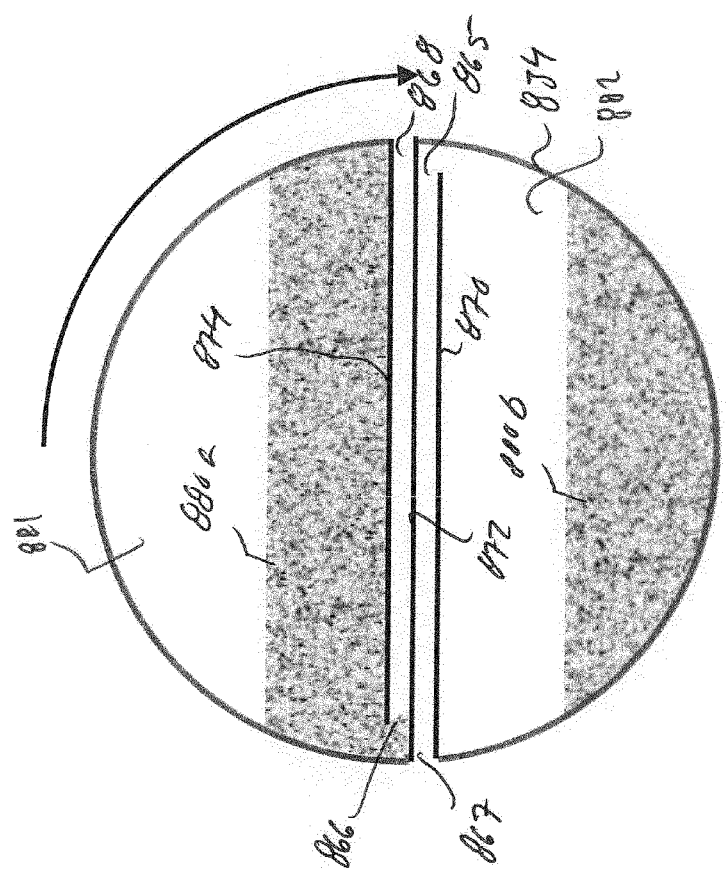
FIG. 15 depicts in a cross sectional view a third position of a second embodiment of a rotating container.

At the position indicated in FIG. 13, i.e., a starting position, no powder is ejected from the powder container 834. In FIG. 14 the powder container 834 is rotated 45 degrees from the starting position. Still no powder is ejected from the exits 867,868 but powder is starting to be fed into the second inlet 866. In FIG. 15 the powder container is rotated 90 degrees. No powder is ejected but powder is introduced into the first inlet. In FIG. 16 the powder container 834 is rotated 135 degrees from the starting position. Powder is starting to be transferred from the inlet to the exit. Powder is also starting to be introduced into the second inlet In FIG. 17 the powder container is rotated 180 degrees from the starting position. Powder is ejected from the exit of the powder container 834. Powder may be ejected from the first exit at a predetermined range of rotational angles, which may be from 135 degrees to 190 degree. Powder may be ejected from the second exit at a predetermined range of rotational angles, which may be 315-370 degrees. In the example embodiment illustrated in FIGS. 13-17, powder is ejected from the powder container twice per revolution during predetermined ranges of rotational angles. The amount ejected at those two distinct occasions which are separated in time with a constant rotational speed, may be equal or different depending on the size and shape of the inlets and inner walls of the powder container.

In an example embodiment of the present invention it is provided a method for repeatedly distributing a predetermined amount of powder onto a surface. At least one rotatable powder container is provided above said surface. Said powder container comprising at least one exit for providing powder to said surface. At least one opening inside said container is spatially separated from and connected to said at least one exit. A fixed amount of powder is ejected from said powder container during at least one predetermined segment of rotational angles of said powder container, as long as more than a predetermined amount of powder is remaining in the container, from the exit of said powder container onto said surface. Said fixed amount is determined by the shape and size of the at least one opening inside said container. Said amount can repeatedly be distributed to said surface as long as there is powder remaining in the container and said container is rotating. The repetition rate is determined by the rotational speed of said container and the design of said container.

In yet another example embodiment of the present invention it is provided a rotatable powder container. Said powder container comprising at least one exit for providing powder to a surface. At least one opening inside said container is spatially separated from and connected to said at least one exit.

The invention is not limited to the above-described embodiments and many modifications are possible within the scope of the following claims. Such modifications may, for example, involve using a different source of energy beam than the exemplified electron beam such as a laser beam. Other materials than metallic powder may be used such as powder of polymers or powder of ceramics.

The invention claimed is:

1. An additive manufacturing method for forming a three-dimensional article through successive fusion of parts of at least one layer of a powder bed provided on a work table, which parts corresponds to successive cross sections of the three-dimensional article, said method comprising the steps of:

providing at least one rotatable powder container above a powder table, said powder container comprising at least one exit for providing powder to the powder table arranged beside said work table, at least one opening inside said container is spatially separated from and connected to said at least one exit;

rotating said powder container;

ejecting a fixed amount of powder from said powder container during at least one predetermined segment of rotational angles of said powder container, as long as more than a predetermined amount of powder is remaining in the container, from the exit of said powder container onto said powder table, wherein said fixed amount is determined based upon the shape and size of the at least one opening inside said container; and distributing at least a part of said fixed amount of powder from said powder table to said work table with a distributor for forming at least a part of a layer of said powder bed.

2. The method according to claim 1, further comprising the steps of:

providing at least a first container above a powder table, wherein said first container is configured for providing powder beside and in the vicinity of a first end of the working table; and providing at least a second container above powder table, wherein said second container is configured for providing powder beside and in the vicinity of a second end of the working table.

3. The method according to claim 1, further comprising the step of providing a first type of material in a first container and a second type of material in a second container.

4. The method according to claim 3, wherein said first and second type of material differs in powder grain size only.

5. The method according to claim 3, wherein said first and second type of material differs in material composition.

6. The method according to claim 1, further comprising the step of providing a heater in at least one of said powder containers for drying said powder.

7. The method according to claim 1, wherein said powder is ejected when rotating said powder container in a first direction.

8. The method according to claim 7, further comprising the step of rotating the powder container in a second direction for prohibiting powder ejection.

9. The method according to claim 1, further comprising the step of separating said powder container and vacuum chamber by a valve allowing change of powder container during an additive manufacturing process.

10. The method according to claim 1, further comprising the step of providing at least one guide plate for guiding powder material from the powder container to the working table.

11. An additive manufacturing apparatus for forming a three-dimensional article through successive fusion of parts of at least one layer of a powder bed provided on a work table, which parts corresponds to successive cross sections of the three-dimensional article, said apparatus comprising:

at least one rotatable powder container above said work table, said powder container comprising at least one exit for providing powder to a powder table arranged beside said worktable, and at least one opening inside said container, said at least one opening being spatially separated from and connected to said at least one exit; and a distributor for distributing at least a part of said fixed amount of powder from said powder table to said work table for forming at least a part of a layer of said powder bed.

12. The additive manufacturing apparatus according to claim 11, wherein:

at least a first container is provided above the powder table;

said first container is configured for providing powder at the powder table beside and in the vicinity of a first end of the working table;

at least a second container is provided above the powder table; and said second container is configured for providing powder at the powder table beside and in the vicinity of said second end of the working table.

13. The additive manufacturing apparatus according to claim 11, wherein a heater is provided in at least one of said powder containers for drying said powder.

14. The additive manufacturing apparatus according to claim 11, wherein said powder container and vacuum chamber are separated by a valve allowing change of powder container during an additive manufacturing process.

15. The additive manufacturing apparatus according to claim 11, wherein at least one powder guide plate is provided for guiding powder material from the powder container to the working table.

\* \* \* \* \*